United States Patent [19]

MacDonald et al.

[11] 4,381,287
[45] Apr. 26, 1983

[54] SEPARATION OF ZIRCONIUM AND URANIUM

[75] Inventors: David J. MacDonald; Helen G. Henry, both of Reno, Nev.

[73] Assignee: The United States of America as represented by the Secretary of the Interior, Washington, D.C.

[21] Appl. No.: 363,367

[22] Filed: Mar. 30, 1982

[51] Int. Cl.$^3$ .............................................. C01G 25/00
[52] U.S. Cl. .......................................... 423/70; 423/9
[58] Field of Search ............................ 423/2, 4, 9, 70

[56] References Cited

U.S. PATENT DOCUMENTS

| 2,877,250 | 3/1959 | Brown et al. | 423/9 |
|---|---|---|---|
| 2,923,607 | 2/1960 | Peppard | 423/70 |
| 3,006,719 | 10/1961 | Miller | 423/70 |
| 3,178,256 | 4/1965 | Moore | 423/9 |

OTHER PUBLICATIONS

Merritt, Robert C., "The Extractive Metallurgy of Uranium", Colorado School of Mines Research Institute, 1971, pp. 194-201.

Coleman, C. F. et al., "Solvent Extraction with Alkyl Amines", in Industrial and Engineering Chemistry, vol. 50, No. 12., Dec. 58, pp. 1756-1762.

*Primary Examiner*—Deborah L. Kyle
*Assistant Examiner*—Matthew A. Thexton
*Attorney, Agent, or Firm*—William S. Brown; Donald A. Gardiner

[57] ABSTRACT

Zirconium- and uranium-containing hydrocarbon-amine solutions are treated for separation of zirconium and uranium by means of a process comprising: (1) selective stripping of zirconium with an aqueous chloride solution, and (2) scrubbing the resulting aqueous solution with chloride-loaded hydrocarbon-amine solution to selectively remove uranium, thereby yielding an aqueous zirconium solution of low uranium content.

5 Claims, 1 Drawing Figure

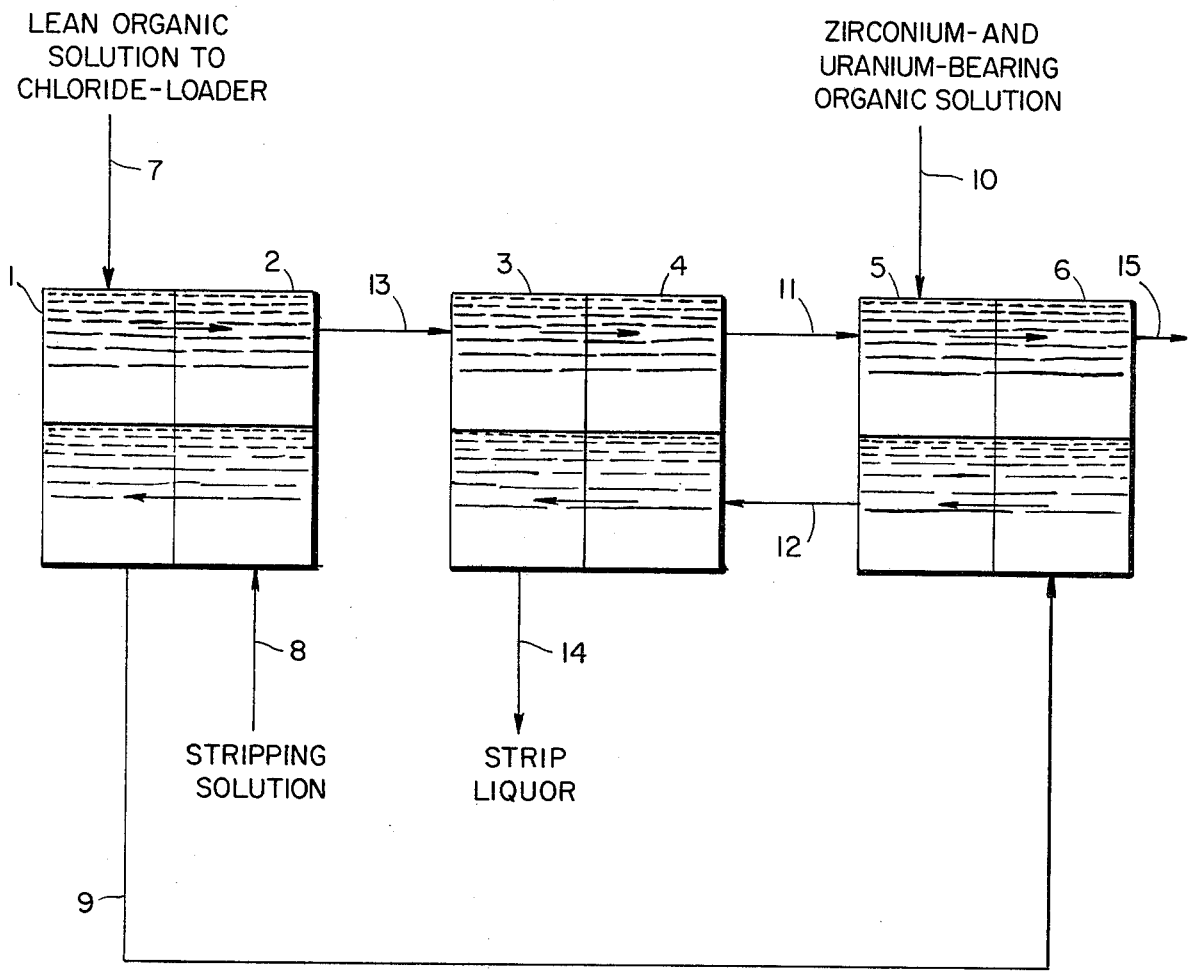

SEPARATION OF ZIRCONIUM AND URANIUM

This invention relates to a process for separation of zirconium and uranium, and production of aqueous zirconium solutions having a low content of uranium, preferably no more than about 3 ppm of uranium relative to zirconium.

In nuclear power reactors of the pressurized-water or boiling-water types, the enriched uranium fuel is customarily contained in fuel-rod assemblies fabricated from high-zirconium alloys. The qualities of strength at high temperature, resistance to corrosion, and small thermal neutron absorption cross-section possessed by zirconium are critical to that application. Hafnium and uranium normally occur in the mineral raw materials from which zirconium is produced. Because of the neutron-absorbing propensities of hafnium and uranium, those elements must be substantially eliminated from zirconium to make it fit for use in nuclear reactors. A typical specification for "nuclear-grade" zirconium requires that it contain no more than 50 parts of hafnium per million parts of zirconium and not more than 3 parts of uranium per million parts of zirconium.

The conventional method of manufacturing nuclear-grade zirconium relies on liquid-liquid extraction with methylisobutyl ketone (hexone) from an aqueous solution of zirconyl-hafnyl chloride in hydrochloric acid and ammonium thiocyanate. This extraction separates both hafnium and uranium from zirconium, but its disadvantages include water pollution, air pollution, fire hazard, and high cost.

Removal of hafnium from a crude zirconyl-hafnyl sulfate solution is also conveniently accomplished by multistage countercurrent liquid-liquid extraction from dilute sulfuric acid solution with a hydrocarbon solution containing a water-insoluble tertiary amine, as disclosed, e.g., in U.S. Pat. No. 3,658,466. In this extraction procedure, zirconium is transferred to an organic-phase extract while hafnium is retained in an aqueous-phase raffinate. Zirconium is recovered from the organic phase by stripping with an aqueous carbonate solution. But in this extraction process approximately three-fourths of any uranium present in the crude zirconyl-hafnyl sulfate solution remains with the zirconium in the organic-phase extract, as well as the subsequent aqueous strip solution. This generally results in a zirconium product having a uranium content far in excess of the above-discussed limit.

Aqueous chloride solutions have also been employed for stripping zirconium from the hydrocarbon-amine organic phase, as disclosed in Japanese Pat. No. 73 79,711 (Chem. Abstr. 80:136104w) and French Pat. No. 2,169,766 (Chem. Abstr. 80:85334m). Again, however, the processes are ineffective for efficient separation of zirconium and uranium.

It has now been found, according to the process of the invention, that efficient separation of zirconium and uranium, and resulting production of zirconium solutions of low uranium content, may be achieved by means of a process comprising the following steps:

Step 1: A zirconium- and uranium-containing hydrocarbon-amine organic phase, of the type discussed above, is stripped with an aqueous chloride solution, whereby most of the zirconium and a small amount of the uranium are extracted into the aqueous phase.

Step 2: The zirconium- and uranium-loaded aqueous stripping solution is scrubbed with a chloride-loaded hydrocarbon-amine organic solution to further reduce the uranium content of the aqueous phase.

Although the process of the invention consists of the two above-defined steps, in practice it will generally be preferred to carry out the steps as parts of a combined, continuous process, as illustrated in the accompanying FIGURE, discussed below.

It has also been found that optimum transfer of uranium from the aqueous phase to the organic phase in Step 2 occurs only under conditions of sufficiently high chloride-ion activity, i.e., the concentration of chloride in both the aqueous and organic phases must be at a suitably high level. Although the optimum chloride concentrations in the aqueous and organic phases may vary with the specific nature of these solutions, as well as that of the zirconium- and uranium-containing feed solution, a chloride concentration of about 150 to 175 grams per liter in the aqueous phase, and about 7.0 to 7.5 grams per liter in an organic phase containing 0.2 mole amine per liter, is generally satisfactory. A mole ratio of chloride to amine of about 1.0 in the organic phase is generally satisfactory.

It has been found that these chloride concentrations in the organic and aqueous phases can generally be achieved only by the use of a combination of a chloride salt, such as sodium chloride, and hydrochloric acid. Use of either component alone generally fails to provide the required level of chloride-ion activity. Optimum ratios of chloride salt to hydrochloric acid will also vary with the specific solutions employed, but a mole ratio of salt-to-acid of about 13:1 to 6:1 is usually satisfactory, particularly when the preferred salt, NaCl, is employed.

Stripping and scrubbing operations of the invention are preferably accomplished by contacting organic and aqueous solutions in a multistage countercurrent manner, e.g., in mixer-settler equipment, or in other equipment designed for accomplishing liquid-liquid extraction.

The hydrocarbon-amine organic solutions, employed in both Step 1 and Step 2 of the invention, consist essentially of a water-insoluble tertiary amine and a diluent for said amine. In addition, a modifier for improving separation of dispersed aqueous and organic phases may be employed. The preferred amine is Alamine 336, a water-insoluble mixture of symmetrical, straight-chain, saturated tertiary amines having alkyl groups of $C_8$ to $C_{10}$, with $C_8$ predominating. Kerosene is the preferred diluent, although any water-immiscible, nonreactive, nonpolar solvent capable of dissolving a high molecular weight tertiary amine could be used. The preferred modifier is decanol, but other alcohols may also be used. Proportions of the ingredients are not critical and determination of optimum concentrations is within the skill of the art.

The invention will be more specifically illustrated by reference to the FIGURE which shows diagrammatically a typical arrangement of the flow of organic and aqueous streams in the process of the invention. The invention is not, however, limited to this particular arrangement. Each rectangular box in the FIGURE represents a single equilibrium organic-to-aqueous contacting unit, with the horizontal center-line symbolizing the organic-to-aqueous interface (the organic phase is assumed to be less dense than the aqueous phase). Hence, the organic-phase flows are shown by arrows above the plane of the horizontal center-lines, and aqueous-phase flows are shown by arrows below the horizontal center-lines. The FIGURE shows two countercurrent contacting units for each type of contacting operation. However, three or more units may be desirable for specific embodiments of the invention.

The three pairs of contacting units shown in the FIGURE consist of chloride-loading units 1 and 2, uranium-scrubbing units 3 and 4, and zirconium-stripping units 5 and 6. The chloride-loading units serve to load lean hydrocarbon-amine organic solution with chloride for the subsequent uranium-scrubbing operation. The organic solution, stream 7, is introduced into the first of the chloride-loading units, and chloride loading is accomplished by contacting with a stream of aqueous stripping solution 8. This stripping solution consists essentially of an aqueous solution of a chloride salt and HCl in order to provide the necessary chloride-ion activity in both organic and aqueous phase, as discussed above. The preferred chloride salt is NaCl, although other chlorides such as alkali metal or alkaline earth or ammonium chlorides may be used. It has been found that the stripping solution will generally need to be at least 4.5 molar in total chloride and at least 0.5 molar in HCl in order to provide the required chloride-ion activity.

Following chloride loading, the stream of post-loader stripping solution 9 is introduced into the second of the two zirconium-stripping units (reference 6), while zirconium- and uranium-bearing hydrocarbon-amine organic feed solution 10 is introduced into the first of the two zirconium-stripping units (reference 5). Uranium-bearing hydrocarbon-amine organic solution is also introduced, via stream 11, into the first of the zirconium-stripping units where it is combined with the zirconium- and uranium-bearing feed solution (stream 10). Thus, the combined organic solutions are contacted with the aqueous chloride stripping solution (stream 9), whereby zirconium is substantially completely, and selectively, stripped from the organic phase, with a relatively small amount of uranium also being stripped from the organic phase (Step 1 of applicants' process). The resulting loaded aqueous strip solution, stream 12, will generally contain the metals in a zirconium-to-uranium ratio of about 8,000:1 to 12,0001:1. This compares to a range of zirconium-to-uranium ratios of about 1,500:1 to 2,500:1 in the feed solution (stream 10).

Although a substantial reduction of uranium, as compared to zirconium, is achieved by means of the aqueous chloride stripping, the uranium content of the stripping solution is still too high to enable preparation of zirconium of the very low uranium contents discussed above. Accordingly, a subsequent scrubbing of the loaded stripping solution with chloride-loaded hydrocarbon-amine organic solution is employed to further substantially reduce the content of uranium in the aqueous phase (Step 2 of applicants' process). Thus, referring again to the FIGURE, the loaded aqueous strip solution (stream 12) is contacted in uranium-scrubbing units 3 and 4 with chloride-loaded hydrocarbon-amine organic solution from chloride-loading units 1 and 2 via stream 13. The resulting aqueous strip liquor, stream 14, contains uranium in very low concentrations, e.g., about 3 parts or less per million parts of zirconium, as discussed above.

The uranium-bearing chloride-loaded organic solution from the zirconium-stripping units, stream 15, may be treated with aqueous sodium carbonate solution in similar contacting units (not shown in FIGURE) to recover the amine component, while transferring the uranium and chloride to an aqueous waste stream. The regenerated amine may then be recycled for use in preparing the hydrocarbon-amine solutions of streams 7 and 10.

Temperature and pressure are not critical parameters in the stripping and scrubbing operations of the invention, ambient temperature and pressure usually being satisfactory. Duration of contact between aqueous and organic phases is also not critical, but residence time for each phase in the settling chamber of mixer-settler units should be at least 2 minutes, preferably 5 minutes or more, to permit complete phase separation.

Preparation of zirconium metal, with correspondingly low uranium content, from the aqueous strip liquor produced by the process of the invention may be accomplished by conventional procedures such as precipitation of $ZrO_2$ by ammonia, chlorination of said $ZrO_2$ to $ZrCl_4$, and reduction of said $ZrCl_4$ with magnesium metal in the Kroll process.

The process of the invention will be more specifically illustrated by the following example.

EXAMPLE

The procedure employed in this example was essentially the same as that illustrated in the FIGURE, and employed mixer-settler units having mixer cells 57 mm deep, 57 mm wide and 57 mm long, and settling chambers 57 mm deep, 57 mm wide and 122 mm long. Mixer-cell volume was 185 ml, and settling-chamber volume was 396 ml.

The feed solution (stream 10) was an organic solution consisting of 10 wt-pct Alamine 336, 5 wt-pct decanol and 85 wt-pct kerosene, and bearing 3.79 g/l zirconium and 1.97 mg/l uranium as sulfates.

A separate organic solution consisting of 10 wt-pct Alamine 336, 5 wt-pct decanol and 85 wt-pct kerosene (stream 7) was introduced into the first of two countercurrent mixer-settler contacting units (chloride-loading units) at a steady flow rate of 18 ml/min. Into the second of the two countercurrent mixer-settler contacting units, at a steady flow rate of 12 ml/min, was introduced an aqueous stripping solution containing 4.0 mol/l sodium chloride and 0.5 mol/l hydrochloric acid (stream 8), for an organic:aqueous phase ratio of 1.5.

The chloride-loaded organic solution (stream 13), at 18 ml/min, was introduced into the first of two countercurrent mixer-settler contacting units; while into the second of the two countercurrent mixer-settler contacting units (uranium-scrubbing units) was introduced the aqueous stream (stream 12) from the zirconium-stripping units at the same 12 ml/min flowrate as stream 8. Stream 12 contained 14 g/l zirconium and 1.0 mg/l uranium. The desired product, strip liquor emerging from the first uranium-scrubbing unit (stream 14), contained 14 g/l zirconium and 0.03 mg/l uranium, for a uranium:zirconium ratio of 2 parts per million.

The uranium-bearing organic solution (stream 11) emerging from the second of two uranium-scrubbing mixer-settler units was combined with the zirconium- and uranium-bearing organic solution (stream 10), and that combined organic-phase flow was introduced into the first of two countercurrent mixer-settler contacting units (zirconium-stripping units). Into the second of these was introduced a chloride-bearing aqueous solution (stream 9). This contacting, at an organic:aqueous phase ratio of 5.25, produced a zirconium-depleted uranium-bearing organic extract (stream 15) and an aqueous stream (stream 12) high in zirconium (14 g/l zirconium) but not free of uranium (1.0 mg/l uranium).

The weight ratio of uranium to zirconium in stream 10 was 520 ppm, while the ratio of uranium to zirconium in the strip liquor, stream 14, was 2.1 ppm.

We claim:

1. A process for separation of zirconium and uranium comprising:
    stripping a zirconium- and uranium-containing hydrocarbon-amine organic solution with an aqueous chloride solution, whereby zirconium is selectively extracted from the organic solution, with extraction of only minor amounts of uranium, and
    scrubbing the resulting zirconium- and uranium-containing aqueous solution with a chloride-loaded hydrocarbon-amine organic solution to selectively extract uranium, whereby the uranium content of the solution is further lowered to yield an aqueous zirconium solution substantially free of uranium.

2. The process of claim 1 in which the hydrocarbon-amine organic solutions consist essentially of solutions of water-insoluble tertiary amines in hydrocarbon diluents.

3. The process of claim 1 in which the aqueous chloride solution comprises a solution of a chloride salt and hydrochloric acid.

4. The process of claim 3 in which the chloride salt is sodium chloride.

5. The process of claim 1 in which the product zirconium solution contains uranium in an amount of no more than about 3 ppm of the zirconium.

* * * * *